Aug. 9, 1960 J. P. SWANSON ET AL 2,948,855

ELECTRICAL PULSE-FORMING

Filed June 11, 1957 3 Sheets-Sheet 1

INVENTORS
JOSEPH P. SWANSON
GENE E. TALLMADGE

BY Lippincott & Smith

ATTORNEYS

INVENTORS
JOSEPH P. SWANSON
GENE E. TALLMADGE
BY Lippincott & Smith
ATTORNEYS

INVENTORS
JOSEPH P. SWANSON
GENE E. TALLMADGE
BY Lippincott & Smith
ATTORNEYS

United States Patent Office 2,948,855

Patented Aug. 9, 1960

2,948,855

ELECTRICAL PULSE-FORMING

Joseph P. Swanson, Menlo Park, and Gene E. Tallmadge, Redwood City, Calif., assignors to Levinthal Electronic Products, Inc., Palo Alto, Calif., a corporation of California Filed June 11, 1957, Ser. No. 665,050

9 Claims. (Cl. 328—67)

This invention relates to improvements in the art of forming electric pulses.

The invention is particularly useful for pulse modulating high-power klystrons. For example, a particular high-power klystron designed for pulsed operation should preferably be supplied with modulating pulses having substantially rectangular waveform, an amplitude of about 50,000 volts, rise and fall times in the order of one microsecond, tops flat to less than two percent, durations adjustable over a continuous range from one microsecond to several hundred microseconds, and a maximum duty cycle in the order of fifty percent. Furthermore, the apparatus must operate reliably and should not be unduly complex nor unreasonably expensive. Conventional pulse-forming techniques heretofore known are inadequate for meeting such specifications. Other uses and applications of this invention will be apparent to those skilled in the art.

Heretofore, one of the known techniques for the formation of rectangular-waveform electric pulses employs circuits, wherein two electrical conductors or chassis sections, sometimes called decks (which may be two parts of a divided electronic circuit chassis, disposed one above the other) are substantially insulated from one another and have therebetween a capacitance, hereinafter called an interdeck capacitance for convenience, which may include a physical capacitor or may consist entirely of the inherent capacitance between the two conductors. Similarly, there is a resistance between the two conductors, hereinafter called an interdeck resistance for convenience, which may include a physical resistor or may consist entirely of the inherent leakage resistance between the two conductors or decks. "Substantially insulated" means that, exclusive of the temporary paths through the sometimes conductive tube hereinafter described, the time constant of the interdeck resistance and capacitance is large compared to the pulses that are to be formed, so that discharge between the capacitance through the interdeck resistance is practically negligible during the duration of a pulse, while said tube is non-conductive.

One such conductor or chassis deck is commonly maintained at a fixed electric potential, while the other conductor or chassis deck can assume various potentials (and therefore is said to be "floating") responsive to changes in the charge of the interdeck capacitance. A pulse of current is supplied to the floating deck, usually through a normally non-conductive electron tube mounted upon and having a cathode connected to the floating deck. This pulse of current charges the interdeck capacitance and provides a sudden voltage increase between the two decks. Subsequently, the interdeck capacitance is suddenly discharged, usually through a normally non-conductive electron tube having an anode connecting to the floating deck and a cathode connected to the other deck, whereupon there is a sudden voltage decrease between the two decks. Thus, there is provided an essentially rectangular waveform voltage pulse between the two decks. The duration of the pulse depends upon the time interval between the respective conductions of current by the two electron tubes, which can be controlled by supplying suitably time-spaced triggering pulses to control grids of the two tubes for rendering each tube momentarily conductive in controlled sequence.

Certain limitations restrict the usefulness of prior floating-deck circuits. Unless the tube used for charging the interdeck capacitance is kept in a highly conductive state (that is, a state wherein the anode-to-cathode resistance through the tube is low so that a considerable current will flow whenever a positive voltage exists between the anode and cathode) throughout the entire duration of each output pulse, the circuit cannot supply reasonably flat-topped pulses to low-impedance utilization circuits, nor can it supply flat-topped pulses of very long duration, because any flow of current to or from the floating deck progressively changes the interdeck voltage. On the other hand, if the charging tube is so arranged that it remains conductive for an appreciable fixed time, the adjustability of the pulse duration is impaired, and in particular the minimum pulse duration is increased. Furtherfore, the triggering of the electron tubes to become conductive reliably at the proper times, without unduly restricting pulse durations, duty cycles, or other performance characteristics, presents problems that have not heretofore been completely solved, particularly in the case of high-voltage modulators for supplying pulses with amplitudes in the order of 50,000 volts.

Briefly stated, in accordance with certain aspects of this invention, a first circuit chassis deck is "floating" voltage-wise with respect to a second circuit deck, and circuit elements mounted upon the two decks form a basic floating deck pulse circuit operable to provide essentially rectangular-waveform voltage pulses between the two decks. A cathode follower connected in responsive relation to the voltage between the first and second decks, together with certain limiting arrangements hereinafter described, provides a relatively low-impedance source of reasonably rectangular-waveform pulses at intermediate amplitude levels in the order of 200 to 5,000 volts. The second deck is made "floating" with respect to a third deck, so that the three decks in combination form a compound floating deck circuit. High-voltage output pulses are formed by alternately charging and discharging the interdeck capacitance between the second and third decks.

The intermediate-amplitude voltage pulses provided between the first and second decks maintain an electron tube for charging the interdeck capacitance between the second and third decks in a highly conductive state throughout the pulse durations, and thus prevent undesirable sag of the high-voltage output pulse top irrespective of the time length of pulse. The interdeck capacitance between the first and second decks, and the interdeck capacitance between the second and third decks, are discharged substantially simultaneously through electron tubes provided for this purpose, so that the charging tube for the second deck is cut off just as the capacitance between the second and third decks begin to discharge. In this manner a high-voltage pulse (having an amplitude of 50,000 volts, for example) is provided between the second and third decks. Pulse rise and fall times are very rapid (in the order of one microsecond) for pulses of this magnitude, and the pulse top is essentially flat throughout pulse durations varying from as short as one microsecond to as long as several hundred microseconds. Timing and triggering circuits mounted on respective ones of the three decks, as well as upon a fourth control deck, hereinafter more fully described, precisely control the beginning and end of each pulse to provide output pulses of controlled duration that is adjustable over a substantial range.

The foregoing and other aspects of this invention may be better understood from the following description of illustrative examples taken in connection with the accompanying drawings. The scope of the invention is pointed out in the appended claims.

Figure 1:
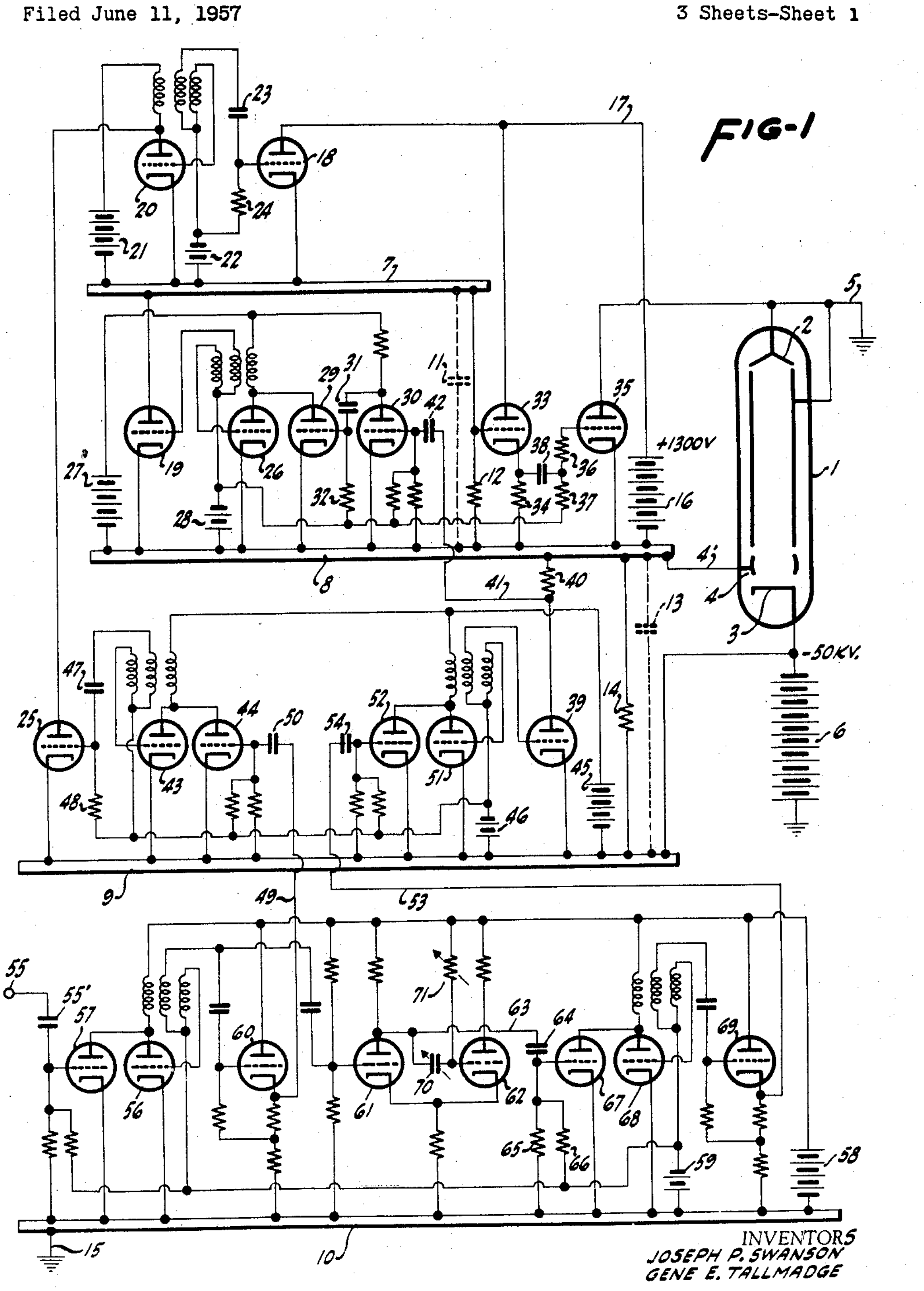
Fig. 1 is a schematic circuit diagram of a pulse modulator for a high-power pulsed klystron.

Referring to Fig. 1 of the drawings, a high-power klystron of a current type designed for pulsed operation is schematically represented at 1. This klystron has a collector electrode or anode 2, a cathode 3, and a control or modulating electrode 4. The microwave resonators and other structural details of the klystron, which are not material to the present invention, are not shown. This klystron is designed for operation with a supply voltage of 50,000 volts between collector 2 and cathode 3. Accordingly, collector electrode 2 is connected to circuit ground, as indicated at 5, and cathode 3 is connected to a —50,000 volt supply 6. The klystron is so designed that the tube is completely cut off when control electrode 4 is at cathode potential, and is completely on (for the delivery of maximum output power) when the control electrode is at the same potential as collector 2. The klystron is usually operated by turning it on and off periodically to produce periodic bursts of output power. The duration of each burst may be from one to several hundred microseconds, and the duty cycle of the klystron may be as high as 50 percent.

Consequently, a modulating circuit must be provided to supply electrode 4 with periodic voltage pulses having an amplitude of 50,000 volts, a pulse duration adjustable from one microsecond to several hundred microseconds, and a duty cycle as high as fifty percent. The modulating pulses should have essentially rectangular waveforms, with fast rise and fall times (in the order of one microsecond), and with the pulse tops flat to less than two percent so that the output power delivered by the klystron will be essentially constant during each burst. The present invention provides such a modulating circuit, which will now be described.

The modulator or pulse-forming circuit comprises four electrically conductive decks or chassis sections 7, 8, 9 and 10. The four decks are substantially insulated from one another, and preferably decks 7, 8 and 9 are disposed one above another. Deck 10 may be disposed in any convenient location relative to the other three decks. Decks 7 and 8 are floating decks—that is, they may assume various electric potentials during an operating cycle of the circuit. For convenience, deck 7 is called the upper floating deck and deck 8 is called the lower floating deck. Deck 8 is connected to control electrode 4 of the klystron (or other utilization circuit) through lead 4'. Deck 9, called the buffer deck, is connected to voltage supply 6 and thereby is maintained at a constant potential of —50,000 volts. Deck 10, called the control deck, carries the timing control circuits hereinafter described.

Between decks 7 and 8 there is an interdeck capacitance 11 and an interdeck resistance 12. Capacitance 11 includes the inherent circuit capacitance between decks 7 and 8, and may or may not (usually not) include a physical capacitor. Resistance 12 includes the inherent resistance between decks 7 and 8, and preferably also includes a physical resistor having a resistance of several megohms. The time constant of capacitance 11 and resistor 12 is long compared to the durations of the pulses that are to be formed; and therefore, with respect to the pulse-wise operation of the circuit decks 7 and 8 are substantially insulated from each other.

Between decks 8 and 9 there is an interdeck capacitance 13 and an interdeck resistance 14. Capacitance 13 includes the inherent circuit capacitance between decks 8 and 9, and also includes the interelectrode capacitance between control electrode 4 and cathode 3 of the klystron. A small physical capacitor might also be included, but usually it is not. Resistance 14 includes the inherent circuit resistance between decks 8 and 9, the inherent input resistance between electrodes 3 and 4 of the klystron, and a physical resistor of appropriate size to provide the conventional grid leak between control electrode 4 and cathode 3.

The voltage between decks 9 and 10 is substantially constant at a value fixed by high-voltage supply 6, and therefore the interdeck capacitance and resistance between decks 9 and 10 is not significant to the pulse-wise operation of the circuit, and is not illustrated in the drawings. Deck 10 is connected to circuit ground, as is indicated at 15, for maintaining the adjustable timing control circuits substantially at ground potential. Consequently, dangerous high voltages and difficult insulation problems are avoided in the adjustable timing circuits.

A voltage supply 16 mounted upon deck 8 provides a lead 17 with a fixed positive potential of 1300 volts relative to deck 8. An electron tube 18, which may advantageously be a triode vacuum tube, is mounted upon and has its cathode connected to deck 7. The anode of tube 18 is connected to lead 17, and is thereby maintained at a potential of 1300 volts positive with respect to deck 8. Consequently, when tube 18 becomes conductive, as hereinafter explained, current flowing through tube 18 charges interdeck capacitance 11 and raises deck 7 to a substantial positive potential relative to deck 8. Another electron tube 19, which may advantageously be a triode vacuum tube, is mounted upon and has its cathode connected to deck 8. The anode of tube 19 is connected to deck 7, so that when tube 19 is conductive interdeck capacitance 11 discharged through tube 19, and the potential of deck 7 is returned to substantially equality with the potential of deck 8. By biasing tubes 18 and 19 to be normally non-conductive, and by causing tubes 18 and 19 to become alternately conductive, substantially rectangular-waveform voltage pulses of intermediate amplitude can be provided between decks 7 and 8. Thus, decks 7 and 8 and the circuits associated therewith constitute a basic floating-deck pulse generator.

Mounted upon deck 7 there is a conventional blocking oscillator comprising a vacuum tube 20, positive anode-voltage supply 21, and negative bias-voltage supply 22. The output of this blocking oscillator is connected to the control grid of tube 18 through a coupling capacitor 23. One end of a resistor 24 is connected to negative bias-voltage supply 22, and the other end of the resistor is connected to the control grid of electron tube 18 so that supply 22 biases tube 18 to be normally non-conductive. Each time that the blocking oscillator mounted on deck 7 operates it supplies a short-duration positive-going electric pulse to the control grid of tube 18, which causes tube 18 to conduct a pulse of current for charging interdeck capacitance 11. The duration of the positive-going pulse supplied to the control grid of tube 18 is at least as short as the minimum duration of the output pulses that are to be generated. After tube 18 is cut off by termination of the pulse supplied to its control grid the charge trapped on capacitor 11 maintains deck 7 at a substantially constant potential relative to deck 8 until capacitor 11 is discharged by means hereinafter described. Thus, the width or duration of the voltage pulses between decks 7 and 8 is substantially independent of the pulse width of the pulses supplied by the blocking oscillator. Furthermore, by mounting the blocking oscillator on deck 7 the control grid potential of tube 18 is not affected by the sudden changes that necessarily occur in the potential of deck 7.

Operation of the blocking oscillator at the desired times is triggered by means including a conventional driver stage comprising triode vacuum tube 25, which preferably is mounted upon and has its cathode connected to deck 9. The anode of tube 25 is connected to the anode of tube 20, so that each positive electric pulse supplied to the control grid of tube 25, as hereinafter explained, causes tube 25 to conduct a pulse of current for triggering operation of the blocking oscillator comprising tube 20. It is evident that other types of trigger circuits, such as multivibrators, might be substituted for the blocking oscillators hereinbefore and hereinafter described.

Mounted upon deck 8 there is another conventional blocking oscillator comprising vacuum tube 26, a positive anode-voltage supply 27, and a negative bias-voltage supply 28. The control grid of electron tube 19 is connected to the output of the blocking oscillator mounted on deck 8 in such a way that the negative bias-voltage supply 28 normally maintains the control grid of tube 19 at a sufficiently negative potential that tube 19 is normally cut off. The blocking oscillator comprising tube 26 is designed to supply substantially rectangular-waveform positive-going voltage pulses to the control grid of tube 19 each time that the blocking oscillator operates. The positive-going pulses so supplied render tube 19 conductive for a sufficient time interval to discharge interdeck capacitance 11.

Operation of the blocking oscillator comprising tube 26 at desired times is triggered by a conventional driver stage comprising vacuum tube 29 mounted upon and having its cathode connected to deck 8. The anode of tube 29 is connected to the anode of tube 26 so that a positive-going pulse supplied to the control grid of tube 29 triggers the blocking oscillator and initiates the conduction of current by tube 19 for discharging the interdeck capacitance 11. A conventional amplifier and inverter stage, comprising vacuum tube 30, is connected to the control grid of tube 29 through a coupling capacitor 31. A resistor 32 is connected between the control grid of tube 29 and the negative bias supply 28. Consequently, small negative-going pulses supplied to the control grid of tube 30 are converted into larger positive-going pulses supplied to the control grid of tube 29 for triggering the blocking oscillator comprising tube 26.

Operation of the basic floating-deck circuit comprising decks 7 and 8 may be summarized as follows: Deck 7, connected to deck 8 through the interdeck resistance 12, is normally at an electric potential substantially equal to the potential of deck 8. Upon the application of a positive-going triggering pulse (by means hereinafter described) to the control grid of driver stage tube 25 mounted on deck 9, the blocking oscillator mounted on deck 7 is triggered and supplies a positive-going electric pulse to the control grid of tube 18. Thereupon, tube 18 becomes momentarily conductive, and conducts a pulse of current that rapidly charges interdeck capacitance 11 and suddenly raises the potential of deck 7 to a substantial positive value with respect to deck 8. Upon the subsequent application of a negative-going triggering pulse to the control grid of amplifier stage tube 30 (by means hereinafter described), the blocking oscillator mounted on deck 8 is triggered and supplies a positive-going pulse to the control grid of tube 19. Thereupon tube 19 becomes conductive and the interdeck capacitance 11 rapidly discharges through tube 19 and the potential of deck 7 is returned suddenly to substantial equality with the potential of deck 8.

Thus, an essentially rectangular-waveform positive-going voltage pulse is provided between decks 7 and 8, the duration of which is controlled by the time interval between the positive-going triggering pulse supplied to the control grid of tube 25 and the negative-going triggering pulse subsequently supplied to the control grid of tube 30. The pulse rise and fall times are proportional to capacitance 11 and inversely proportional to the magnitude of the charging and discharging currents respectively conducted by tubes 18 and 19. By careful design to keep interelectrode capacitance 11 reasonably small, and by supplying large positive-going pulses to the control grids of tubes 18 and 19 for rendering these tubes highly conductive at appropriate times, very small rise and fall times, considerably less than one microsecond, can readily be obtained.

To permit the generation of relatively short-duration voltage pulses, having a minimum duration in the order of one microsecond, the blocking oscillator comprising vacuum tube 20 is designed to supply pulses of one microsecond or less duration to the control grid of tube 18 so that tube 18 remains conductive for a very short interval, preferably less than one microsecond. As soon as tube 18 becomes non-conductive again, capacitance 11 begins to discharge through resistor 12. Therefore, especially during the production of voltage pulses of maximum amplitude, in the order of several hundred microseconds, there may be a noticeable decrease or sag in the pulse top. The amount of this sag can be minimized by making the time constant of the interdeck capacitance 11 and the interdeck resistance 12 as large as is practicable. Since capacitance 11 must be kept relatively small to obtain short rise and fall times, resistance 12 must be relatively large, at least several megohms.

Because of these requirements, a simple floating-deck circuit is not in itself capable of supplying flat-topped pulses directly to a low-impedance utilization circuit since in such a case the input impedance of the utilization circuit would be in parallel with resistance 12, and result in a low value of interdeck resistance through which capacitance 11 would begin to discharge rapidly as soon as tube 18 became non-conductive.

To minimize this difficulty a cathode follower stage comprising vacuum tube 33 is connected in responsive relation to the voltage between decks 7 and 8. Cathode follower tube 33 is mounted upon deck 8 and has its cathode connected to deck 8 through a conventional load resistor 34. The anode of tube 33 is connected to lead 17 and the control grid of tube 33 is connected to deck 7. Since the cathode follower can be designed to have a reasonably high input resistance (as is well known to those skilled in the art), the addition of the cathode follower stage produces only a small decrease in the interdeck resistance 12. Thus, the time constant of capacitance 11 and resistance 12 can be kept fairly long relative to the average durations of voltage pulses formed between two decks, and sag of the pulse tops due to the discharge of capacitors 11 through resistors 12 is held to reasonably small values.

Since the cathode potential follows the control grid potential in a well-designed cathode follower stage quite closely despite considerable loading by subsequent utilization circuits, the cathode follower stage added to the basic floating-deck circuit provides a low-impedance source of essentially rectangular-waveform voltage pulses. The remaining sag in the pulse tops can be compensated by limiting means hereinafter described, where such is necessary. Thus, there is provided a superior pulse-forming circuit for the production of rectangular-waveform pulses at intermediate voltage levels with pulse amplitudes in the order of 250 to 5000 volts, depending upon the value of the voltage provided by voltage supply 16 and other circuit design parameters.

For the production of high-level voltage pulses, such as the pulses of 50,000 volts amplitude required to modulate klystron 1, deck 8 is made a floating deck with respect to deck 9, so that decks 7, 8 and 9, and their associated circuits, constitute a compound floating-deck pulse circuit. An electron tube 35, which may advantageously be a triode vacuum tube, is mounted upon and has its cathode connected to deck 8. The anode of tube 35 is connected to circuit ground at 5, as shown. The control grid of tube 35 is connected through resistors 36 and 37 in series to negative bias-voltage supply 28 so that tube 35 is normally non-conductive. The control grid of tube 35 is connected to the cathode of cathode-follower tube 33 through resistor 36 in series with a coupling capacitor 38.

Upon the appearance of a positive-going pulse at the cathode of tube 33 the control grid of tube 35 is driven positive with respect to its cathode, and tube 35 becomes highly conductive. The grid current drawn by tube 35 is limited by resistor 36, and capacitor 38 charges at a relatively slow rate through resistors 36 and 37, so that the control grid of tube 35 is kept at a positive potential relative to its cathode throughout the duration of the positive pulse at the cathode of tube 33. Furthermore, the voltage drop due to grid current flowing through resistor 36 provides a grid-limiting action such that an essentially flat-topped voltage pulse is provided between the control grid and the cathode of tube 35, despite an appreciable sag which may occur in the tops of voltage pulses produced between decks 7 and 8 and at the cathode of tube 33. Because the control grid of tube 35 is maintained at a positive potential relative to its cathode, the anode-to-cathode resistance of tube 35 remains low, and deck 8 is effectively clamped at circuit ground potential throughout the entire duration of the output pulse, despite the flow of current through resistor 14 and the utilization circuit (in this case klystron 1).

Another electron tube 39, which may advantageously be a triode vacuum tube, is mounted upon and has its cathode connected to deck 9. The anode of tube 39 is connected to deck 8 through a resistor 40 having a sufficiently low resistance for the rapid discharge of interdeck capacitance 13 through resistance 40 and tube 39 in series whenever tube 39 becomes conductive. When tube 39 first becomes conductive a sudden voltage drop appears across resistor 40, and this voltage drop transmits a negative-going pulse through lead 41 and coupling capacitor 42 to the control grid of tube 30. Thereupon, as hereinbefore explained, a positive-going pulse is transmitted to the control grid of tube 29 which then triggers the blocking oscillator comprising tube 26 for rendering tube 19 conductive. Tube 19 then quickly discharges interelectrode capacitance 11 and terminates the positive voltage pulse between decks 7 and 8, whereupon tube 35 becomes non-conductive. As soon as the flow of current through tube 35 stops, interdeck capacitance 13 quickly discharges through resistor 40 and tube 39 in series, whereupon the potential of deck 8 is quickly driven to substantial equality with the potential of deck 9, which is maintained at −50,000 volts by high-voltage supply 6.

The basic operation of the compound floating deck circuit can be summarized as follows: Tubes 18, 19, 35 and 39 are initially non-conductive and each of the three decks 7, 8 and 9 is substantially at the potential of −50,000 volts provided by supply 6. Upon the supply of a positive-going voltage pulse to the control grid of tube 25, the blocking oscillator mounted on deck 7 is triggered into operation and a positive-going pulse is transmitted to the control grid of tube 18. Tube 18 then conducts a short pulse of current which charges interdeck capacitance 11 and provides a sudden positive-going voltage increase between decks 7 and 8. Responsive to this sudden voltage increase, cathode follower 33 drives and keeps the control grid of tube 35 slightly positive with respect to its cathode, whereupon tube 35 becomes conductive and interdeck capacitance 13 quickly charges to provide a sudden voltage increase between decks 8 and 9.

While tube 35 remains conductive, the potential of deck 8 is clamped at circuit ground potential and control electrode 4 of klystron 1 is maintained at substantially the same potential as collector electrode 2 of the klystron, or about 50,000 volts positive with respect to klystron cathode 3.

Upon a positive-going pulse being subsequently supplied to the control grid of tube 39, tube 39 becomes conductive and a sudden voltage drop is provided across resistor 40. Responsive to this voltage drop, a triggering pulse is transmitted through amplifier tube 30 to the control grid of tube 29, which thereupon triggers the blocking oscillator comprising tube 26 into operation for rendering tube 19 conductive. Thus, tubes 39 and 19 become conductive substantially simultaneously. As soon as tube 19 becomes conductive, interdeck capacitance 11 quickly discharges through tube 19 and there is a sudden voltage decrease between decks 7 and 8, whereupon tube 35 becomes non-conductive. As soon as tube 35 becomes non-conductive, interdeck capacitance 13 quickly discharges through resistor 40 and tube 39 in series, which produces a sudden voltage decrease between decks 8 and 9 and quickly returns the potentials of decks 7 and 8 to substantial equality with the potential of deck 9, namely, −50,000 volts.

Thus, there is provided between decks 8 and 9 an essentially rectangular-waveform positive-going output pulse of 50,000 volts amplitude. The duration of this voltage pulse is controlled by the time interval between the triggering pulses supplied to tubes 25 and 39 respectively, and can thus be adjusted continuously over a considerable range of values (from one microsecond to several hundred microseconds, for example) by controlling and adjusting the time relation of the triggering pulses. Pulse rise and fall time may be in the order of one microsecond, and the clamping action provided by the continuous low anode-to-cathode resistance of tube 35 throughout the entire output pulse duration insures the production of exceptionally flat-topped pulses in which the sag of the pulse top can easily be restricted to an amount less than the two percent specified for optimum pulse modulation of klystron 1. Almost immediately upon the termination of the voltage pulse between decks 8 and 9, all of the circuit capacitances have been restored to their initial charge conditions, and the circuit is ready to begin another cycle of operation. Thus, high duty cycles, exceeding fifty percent, are readily realized.

The only matter remaining for consideration is the means for supplying positive-going pulses in controlled time sequence to the control grids of tubes 25 and 39.

Mounted upon deck 9 there is a first conventional blocking oscillator comprising a vacuum tube 43 and its conventional driver stage comprising vacuum tube 44. Anode voltage for the vacuum tubes is provided by a positive voltage supply 45, and negative bias voltage is provided by negative voltage supply 46. The output of the blocking oscillator comprising tube 43 is connected to the control grid of tube 25 through a differentiating circuit composed of a capacitor 47 and a resistor 48 connected in series, as shown. Resistor 48 is returned to negative bias-voltage supply 46, so that tube 25 is normally cut off. A lead 49 is connected to the control grid of tube 44 through a coupling capacitor 50. Upon the application of a positive-going pulse to lead 49 (by the timing control circuits mounted on deck 10), tube 44 triggers the blocking oscillator comprising tube 43 into operation, and the blocking oscillator supplies a positive-going triggering pulse through the differentiating circuit to the control grid of tube 25. Thereupon, tube 25 conducts a pulse of current and initiates the formation of an output voltage pulse between decks 8 and 9 in the manner hereinbefore explained.

Also mounted upon deck 9 there is a second conventional blocking oscillator comprising a vacuum tube 51, and a conventional driver stage therefor comprising a vacuum tube 52. The output of the last-mentioned blocking oscillator is connected to the control grid of tube 39 in such a way that tube 39 is normally cut off by the negative bias voltage provided by supply 46. A lead 53 is connected to the control grid of tube 52 through a coupling capacitor 54. Upon the application of a positive-going pulse to lead 53 (by the timing control circuits mounted on deck 10), tube 52 triggers the blocking oscillator comprising tube 51 into operation, and the blocking oscillator provides a positive-going pulse to the control grid of tube 39 to initiate termination of the voltage pulse between decks 8 and 9 in the manner hereinbefore explained.

Thus, operation of the compound-floating-deck pulse-forming circuit is controlled by triggering pulses supplied through leads 49 and 53, respectively, both of which may be at low potentials relative to circuit ground in spite of the fact that buffer deck 9 is maintained at a potential of —50,000 volts by high-voltage supply 6.

The purpose of the circuits mounted upon control deck 10 is to supply triggering pulses to leads 49 and 53 in controlled time sequence for initiating and terminating the voltage pulses between decks 8 and 9 that modulate the klystron. Operation is initiated by a positive-going pulse supplied to an input terminal 55 by any suitable means, such as a periodic pulse generator of conventional design. Mounted upon deck 10 there is a first conventional blocking oscillator comprising vacuum tube 56, and its conventional driver stage comprising vacuum tube 57. Anode voltage for the vacuum tubes may be provided by a positive voltage supply 58, and bias voltages are provided by a negative voltage supply 59. The control grid of tube 57 is connected to input terminal 55 through a coupling capacitor 55'.

The output of the blocking oscillator comprising tube 56 is coupled to a conventional cathode follower stage comprising triode vacuum tube 60. The cathode of tube 60 is connected to lead 49. Each positive-going pulse supplied to input terminal 55 triggers the blocking oscillator comprising tube 56 into operation, whereupon a positive-going pulse is transmitted through the cathode-follower to lead 49 for initiating the formation of a 50,000 volt pulse between decks 8 and 9.

At the same time, the blocking oscillator comprising tube 56 supplies a positive-going pulse to a conventional monostable multivibrator circuit comprising vacuum tubes 61 and 62. Thereupon, the multivibrator provides a negative-going rectangular-waveform voltage pulse at lead 63, in a manner that is well known to those skilled in the art. The pulse supplied to lead 63 by the multivibrator is differentiated by a differentiating circuit composed of a capacitor 64 connected in series with a pair of resistors 65 and 66, as shown. At the end of this negative-going rectangular-waveform pulse, the differentiating circuit supplies a positive-going pulse to the control grid of a vacuum tube 67, which is connected as the driver stage for a second conventional blocking oscillator comprising vacuum tube 68. The output of the last-mentioned blocking oscillator is connected to a conventional cathode-follower stage comprising a vacuum tube 69, the cathode of which is connected to lead 53. Each time that a positive-going pulse is supplied to the control grid of tube 67 the blocking oscillator comprising tube 68 is triggered into operation and a positive-going pulse is transmitted through the cathode-follower comprising tube 69 to lead 53.

Thus, the result of each positive-going pulse supplied to input terminal 55 is the triggering of the blocking oscillator comprising tube 56 and the transmission of a positive-going pulse through lead 49 to initiate the formation of a voltage pulse between decks 8 and 9, and the subsequent triggering of the blocking oscillator comprising tube 69 and the transmission of a positive-going pulse through lead 53 to terminate the voltage pulse between decks 8 and 9. The time interval between the pulse transmitted through lead 49 and the pulse subsequently transmitted through lead 53, and therefore the duration of the high-voltage rectangular-waveform pulse provided between decks 8 and 9, is controlled by the amount of time delay provided by the monostable multivibrator comprising tubes 61 and 62.

As is well known to those skilled in the art, the amount of time delay provided by the multivibrator can be adjusted by adjusting the values of either or both of the conventional timing capacitor 70 and timing resistor 71 in the multivibrator circuit. Thus, the output pulse durations of the pulse-forming circuit as a whole can be continuously adjusted over a substantial range of values (from one microsecond to several hundred microseconds, for example) by adjusting either or both of the timing elements 70 and 71. It should be noted that both of these adjustable elements are at reasonably low electric potentials relative to circuit ground, so that the adjustments can be made safely and without encountering substantial insulation difficulties.

Although the pulse-forming circuit has been particularly described as a modulator for high-power pulsed klystrons, it is evident that it will also be found useful in many other applications that will occur to those skilled in the art. In applications where deck 9 may be operated at or near ground potential as, for example, where cathode 3 is connected to circuit ground and connection 5 is supplied with a relatively high positive potential, decks 9 and 10 may be combined by placing the timing circuit of deck 10 upon deck 9 and, if desired, combining parts of the deck 9 and deck 10 circuits for simplification.

Figure 2:
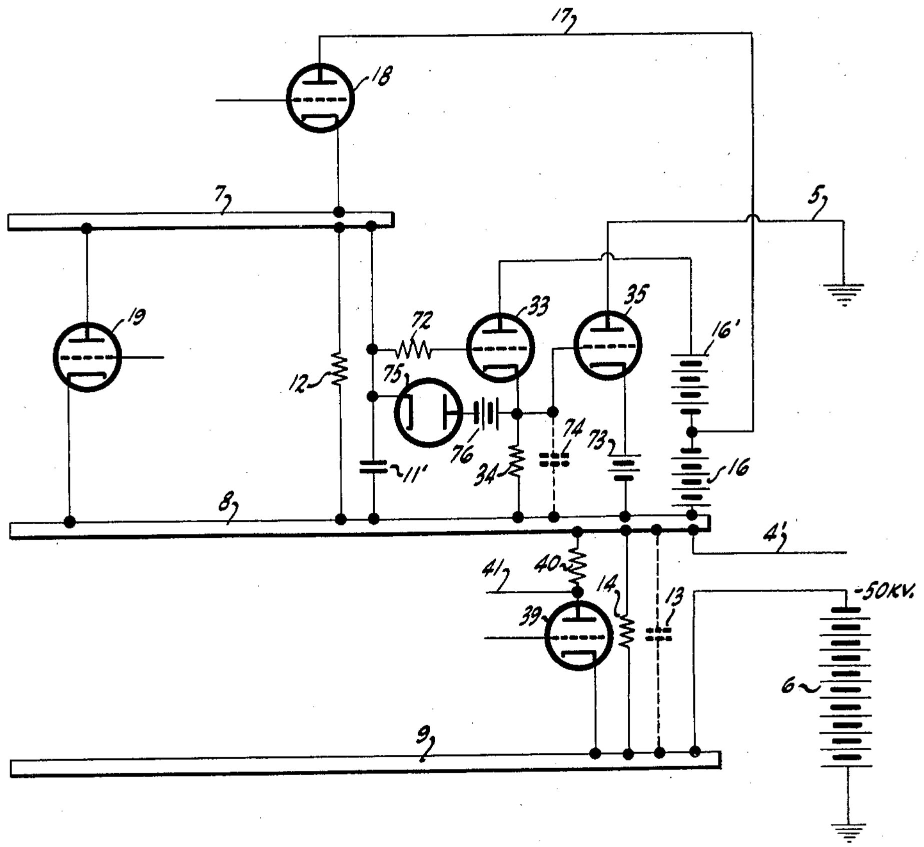
Fig. 2 is a fragmentary circuit diagram showing a modification of the Fig. 1 circuit.

Reference is now made to Fig. 2 of the drawings, which is a fragmentary circuit diagram illustrating a modification that provides a more flat-topped pulse across cathode resistor 34. Parts which have been omitted from the Fig. 2 circuit may be identical to parts illustrated in Fig. 1. Other parts that are identical in Figs. 1 and 2 are identified by the same reference numbers in both figures. Thus, for example, lead 4', ground connection 5, high-voltage supply 6, decks 7, 8 and 9, interdeck resistances 12 and 14, interdeck capacitance 13, power supply 16, lead 17, electron tubes 18, 19, 33, 35 and 39, resistors 34 and 40, and lead 41, illustrated in Fig. 2, are identical to the correspondingly numbered parts illustrated in Fig. 1. Positive-going pulses are supplied at appropriate times to the control grids of tubes 18, 19 and 39 by the means illustrated in Fig. 1 and omitted from Fig. 2 for simplification and clarification of the drawings. The Fig. 2 apparatus differs from the Fig. 1 apparatus in certain respects that will now be described.

In the Fig. 2 apparatus, the interdeck capacitance between decks 7 and 8 may be increased by the addition of a physical capacitor as is indicated at 11'. The anode tube 33 is maintained at a more positive potential than lead 17 by means of an additional voltage supply 16' connected as shown, whereby the anode of the cathode-follower is always maintained at a substantially more positive potential than its control grid and cathode, which assures better linearity in the operation of the cathode-follower stage. The control grid of tube 33 is connected to deck 7 through a grid-limiting resistor 62, and the cathode follower stage is designed so that tube 33 saturates during the positive-going voltage pulses between decks 7 and 8. Saturation current of tube 33 produces across cathode resistor 34 a voltage drop smaller than the peak voltage between decks 7 and 8, and consequently the control grid of tube 33 is driven somewhat positive with respect to the cathode, whereupon grid current flows through resistor 72 to provide grid-limiting of the voltage pulse supplied to the control grid.

As interdeck capacitance 11' discharges through interdeck resistance 12, the voltage between decks 7 and 8 progressively decreases from its peak positive value; but, so long as the voltage between decks 7 and 8 remains greater than the voltage drop across cathode resistor 34 the amount of grid current and the resulting voltage drop across resistor 72 adjusts itself to maintain an essentially constant potential at the control grid of tube 33, which maintains tube 33 substantially at saturation. Thus, the grid-limiting action described maintains a flat top for the voltage pulse provided across resistor 34, despite sag in the voltage between decks 7 and 8, and maintains tube 35 in a highly conductive (small anode-to-cathode resistance) state during the entire duration of the voltage pulse. To permit direct coupling between the cathode of tube 33 and the control grid of tube 35, the bias for tube 35 may be supplied by means of a positive bias voltage supply 73 connected in series with cathode of tube 35, as shown.

As soon as tube 19 begins to conduct current, the interdeck capacitance 11' quickly discharges through tube 19 and there is a sudden voltage decrease between decks 7 and 8, as hereinbefore explained in connection with the Fig. 1 apparatus. As soon as this happens, tube 35 should be cut off quickly so that interdeck capacitance 13 can immediately discharge through tube 39 and resistor 40. However, the speed with which tube 35 can be cut off is limited by the time required to discharge the inherent circuit capacitance 74 between the control grid of tube 35 (and the cathode of tube 33) and deck 8.

Since resistor 34 of the cathode follower stage preferably has a high resistance, the time constant of resistor 34 and capacitance 74 is relatively long. For discharging capacitor 74 rapidly responsive to the sudden voltage decrease between decks 7 and 8, a diode rectifier 75 (poled to conduct current from the cathode of tube 33 to deck 7) in series with a small bias voltage supply 76 is connected between deck 7 and the cathode of tube 33, as shown. Bias supply 76 maintains diode 75 normally non-conductive. The occurrence of a sudden voltage decrease between decks 7 and 8, while the cathode of tube 33 is still at a relatively high positive potential, reverses the voltage across diode 75, whereupon diode 75 becomes highly conductive and capacitor 74 quickly discharges through diode 75. Thus, tube 35 is suddenly cut off, permitting a rapid discharge of interdeck capacitance 13 through tube 39 and providing a short fall time for the pulse formed between decks 8 and 9.

Figure 3:
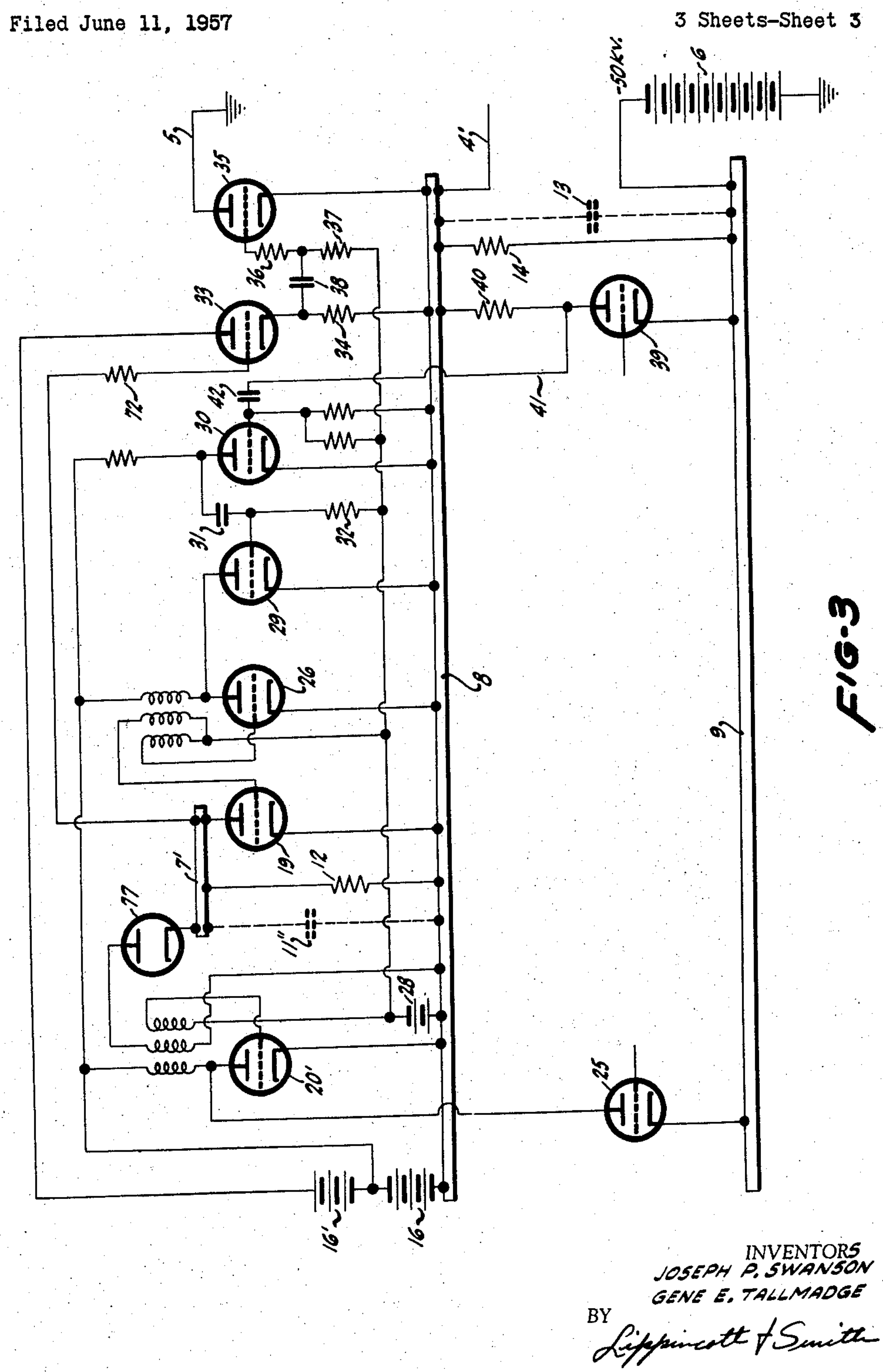
Fig. 3 is another fragmentary circuit diagram showing another modification of the Fig. 1 circuit.

Reference is now made to Fig. 3 of the drawings, which is a fragmentary circuit diagram illustrating another modification. Parts in Fig. 3 that are identical to parts illustrated in Figs. 1 and 2, hereinbefore described, are identified by the same reference numbers. Circuits for supplying positive-going pulses at appropriate times to the control grids of tubes 25 and 39 may be identical to the circuits for this purpose illustrated in Fig. 1 and are omitted from Fig. 3 for simplification and clarification of the drawing. The embodiment illustrated in Fig. 3 is somewhat simpler and less expensive than the embodiments hereinbefore described, particularly in that the circuitry on the upper floating deck is simplified and the floating power supplies associated with the upper floating deck are eliminated.

In the embodiment illustrated in Fig. 3 the upper floating deck 7 of the previously described embodiments is replaced by a smaller floating deck 7', which may be a single wire conductor. Consequently, the interdeck capacitance 11'' may be smaller than capacitance 11 of the Fig. 1 circuit. The blocking oscillator comprising tube 20 of the Fig. 1 circuit has been moved to the lower floating deck 8 and is represented in Fig. 3 at 20'. The output of this blocking oscillator is connected to deck 7' through a rectifier diode 77 poled for the conduction of current pulses from blocking oscillator 20' to deck 7'. Diode 77 takes the place of tube 18 of the previously described embodiments and therefore tube 18 and its associated circuitry is not required in the Fig. 3 embodiment.

Each time that a positive-going pulse is supplied to the control grid of tube 25, as hereinbefore explained in connection with the Fig. 1 apparatus, blocking oscillator 20' is triggered into operation. Thereupon blocking oscillator 20' supplies a current pulse through rectifier diode 77 to deck 7' and this current pulse charges interdeck capacitance 11'' to provide a sudden positive-going increase in the voltage between decks 7' and 8. When capacitance 11'' is fully charged, diode 77 again becomes non-conductive, and is maintained in a normally non-conductive state by the positive voltage between decks 7' and 8. Thereafter, the charge on capacitance 11 can escape only through the high resistance of interdeck resistance 12 until tube 19 is rendered conductive in the manner hereinbefore explained, whereupon capacitance 11 quickly discharges through tube 19 to provide a sudden voltage decrease between decks 7' and 8.

In this way a fairly large essentially rectangular-waveform voltage pulse is provided between decks 7' and 8. This voltage pulse is transmitted through a cathode follower stage comprising vacuum tube 33 for maintaining tube 35 conductive (low anode-to-cathode resistance) throughout the pulse duration. Grid-limiting is provided by resistors 72 and 36 in the manner hereinbefore explained so that the voltage supplied to the control grid of tube 35 is substantially constant throughout the pulse duration. The high-voltage output pulse is formed between decks 8 and 9 in the manner hereinbefore explained in connection with Fig. 1.

It should be understood that this invention in its broader aspects is not limited to specific examples herein illustrated and described, and that the following claims are intended to cover all changes and modifications within the true spirit and scope of the invention.

What is claimed is:

1. Electrical pulse-forming apparatus comprising the following combination: first and second electrical conductors having therebetween an interconductor capacitance; an electron tube connected between said first conductor and said second conductor; means for biasing said tube to be normally non-conductive; means for supplying a current pulse to said first conductor for charging said capacitor to produce a sudden voltage increase between said first conductor and said second conductor; means for subsequently supplying a triggering pulse to render said tube conductive so that said capacitance discharges through said tube to produce a sudden voltage decrease between said first conductor and said second conductor; a cathode follower tube having an anode, a control grid and a cathode, the last-mentioned tube being adapted to conduct no more than a saturation value of cathode current; a resistor connected between said cathode and said second conductor, the resistance of said resistor being such that said saturation value of cathode current produces across said resistor a voltage drop smaller than said voltage increase between said first conductor and said second conductor; means for supplying said anode with a positive electrical potential relative to said second conductor; and a resistor connected in series between said control grid and said first conductor; whereby said voltage drop is substantially constant during the time interval beginning with said sudden voltage increase and ending with said sudden voltage decrease between said first conductor and said second conductor for providing a low impedance source of electric pulses.

2. Electrical pulse-forming apparatus comprising the following combination: first and second electrical conductors having therebetween an interconductor resistance and an interconductor capacitance, said resistance and said capacitance having a large time constant relative to the duration of the electrical pulses that are to be formed; first and second normally non-conductive electron tubes each having an anode and a cathode, the cathode of said first tube and the anode of said second tube being connected to said first conductor, the cathode of said second tube being connected to said second conductor; means for providing first and second triggering electric pulses in sequence; means for causing said first tube to conduct a pulse of current responsive to said first triggering pulse, said current charging said capacitance to produce a sudden voltage increase between said first conductor and said second conductor; means for rendering said second tube conductive responsive to said second triggering pulse, whereupon said capacitance discharges through said second tube to produce a sudden voltage decrease between said first conductor and said second conductor; and a cathode follower connected in responsive relation to the voltage between said first and second conductors for providing a low-impedance source of essentially rectangular-waveform electric pulses.

3. Electrical pulse-forming apparatus comprising the following combination: first and second electrical conductors having therebetween an interconductor resistance and an interconductor capacitance, said resistance and said capacitance having a large time constant relative to the duration of the electrical pulses that are to be formed; first and second normally non-conductive electron tubes each having an anode and a cathode, the cathode of said first tube and the anode of said second tube being connected to said first conductor, the cathode of said second tube being connected to said second conductor; means for providing a first triggering pulse; adjustable delay means responsive to said first triggering pulse for providing a second triggering pulse following said first triggering pulse by an adjustable time interval; means for causing said first tube to conduct a pulse of current responsive to said first triggering pulse, said current charging said capacitance to produce a sudden voltage increase between said first conductor and said second conductor; and means for rendering said second tube conductive responsive to said second triggering pulse, whereupon said capacitance discharges through said second tube to produce a sudden voltage decrease between said first conductor and said second conductor.

4. Electric pulse-forming apparatus comprising the following combination: first and second electrical conductors having therebetween an interconductor resistance and an interconductor capacitance with a long time constant relative to the duration of the electrical pulses that are to be formed; voltage supply means for providing a fixed electric potential relative to said second conductor; a first electron tube connected between said supply means and said first conductor; a second electron tube connected between said first conductor and said second conductor; means for biasing both of said first and second tubes to be normally non-conductive; means for supplying triggering electric pulses to said first and second tubes alternately so that the aforesaid tubes conduct current alternately, whereby said interconductor capacitance is alternately charged through said first tube and discharged through said second tube to provide at said first conductor an essentially rectangular-waveform electric potential that alternates between a value substantially equal to said fixed potential and a value substantially equal to the potential of said second conductor; and a cathode follower connected in responsive relation to said rectangular-waveform potential to provide a low-impedance source of essentially rectangular-waveform electric pulses.

5. Electrical pulse-forming apparatus comprising the following combination: first and second electrically conductive chassis sections having therebetween a capacitance; voltage supply means for providing a positive electric potential relative to said second section; first and second electron tubes each having an anode, a control grid and a cathode, said first tube being mounted on and having its cathode connected to said first section, said second tube being mounted on and having its cathode connected to said second section, the anode of said first tube being connected to said voltage supply means, and the anode of said second tube being connected to said first section; means mounted on said first section for biasing said first tube to be normally non-conductive; means mounted on said second section for biasing said second tube to be normally non-conductive; an electronic trigger circuit mounted on said first section and operable to supply a positive-going electric pulse to the control grid of said first tube, whereupon said first tube conducts a pulse of current for charging said capacitance to produce a sudden voltage increase between said first and second sections; an electronic trigger circuit mounted on said second section and operable to supply a positive-going electric pulse to the control grid of said second tube, whereupon said capacitance is discharged through said second tube to produce a sudden voltage decrease between said first and second sections; means for operating said two trigger circuits alternately; whereby an essentially rectangular-waveform voltage is provided between said first and second sections; and a cathode follower connected in responsive relation to said rectangular-waveform voltage to provide a low-impedance source of essentially rectangular-waveform electric pulses.

6. Electrical pulse-forming apparatus comprising the following combination: first, second and third electrical conductors having a first interconductor capacitance between said first and second conductors and a second interconductor capacitance betweeen said second and third conductors; voltage supply means for providing a positive electric potential relative to said third conductor; first, second, third and fourth normally non-conductive electron tubes, said first tube being connected to said first conductor, said second tube being connected between said first conductor and said second conductor, said third tube being connected between said second conductor and said voltage supply means, and said fourth tube being connected between said second conductor and said third conductor; means for causing said first tube to conduct a pulse of current, said current charging said first capacitance to produce a sudden voltage increase between said first and second conductors; means for rendering said third tube conductive responsive to the aforesaid voltage increase, whereupon said second capacitance charges through said third tube to produce a sudden voltage increase between said second and third conductors; and means for rendering said second and fourth tubes conductive substantially simultaneously, whereupon said first capacitance discharges through said second tube, said third tube is cut off, and said second capacitance discharges through said fourth tube to produce a sudden voltage decrease between said second and third conductors, whereby an essentially rectangular-waveform voltage pulse is provided between said second and third conductors.

7. Electrical pulse-forming apparatus comprising the following combination: first, second, and third electrical conductors having a first interconductor capacitance between said first and second conductors and a second interconductor capacitance between said second and third conductors; voltage supply means providing a positive electric potential relative to said third conductor; a resistor; first, second, third and fourth normally non-conductive electron tubes each having an anode and a cathode, the cathode of said first tube and the anode of said second tube being connected to said first conductor, the cathodes of said second and third tubes being connected to said second conductor, the anode of said third tube being connected to said voltage supply means, the anode of said fourth tube being connected to said second conductor through said resistor, and the cathode of said fourth tube being connected to said third conductor; means for causing said first tube to conduct a pulse of current, said current charging said first capacitance to provide a sudden voltage increase between said first and second conductors; means for rendering said third tube conductive responsive to the aforesaid voltage increase whereupon said second capacitance charges through said third tube to produce a sudden voltage increase between said second and third conductors; means for subsequently rendering said fourth tube conductive, whereupon a sudden voltage drop is provided across said resistor; means for rendering said second tube conductive responsive to the aforesaid voltage drop, whereupon said first capacitance discharges through said second tube to produce a sudden voltage decrease between the first and second conductors; means for rendering said third tube non-conductive responsive to the aforesaid voltage decrease, whereupon said second capacitance discharges through said resistor and said fourth tube in series to produce a sudden voltage decrease between said second and third conductors; whereby an essentially rectangular-waveform voltage pulse is provided between said second and third conductors.

8. Electrical pulse-forming apparatus comprising the following combination: first, second and third electrically conductive chassis sections having a first capacitance between said first and second sections and a second capacitance between said second and third sections, said sections being disposed one above another and being substantially insulated from one another; first voltage supply means mounted on said second section for providing a fixed positive electric potential relative to said section; second voltage supply means for providing a fixed positive electric potential relative to said third section; first, second, third and fourth electron tubes each having an anode, a control grid and a cathode, said first tube being mounted upon and having its cathode connected to said first section, said second and third tubes being mounted upon and having their cathodes connected to said second section, said fourth tube being mounted upon and having its cathode connected to said third section, the anode of said first tube being connected to said first voltage supply means, the anode of said second tube being connected to said first section, and the anode of said third tube being connected to said second voltage supply means; a resistor connected between the anode of said fourth tube and said second section; means mounted on said first section for biasing said first tube to be normally non-conductive; means mounted on said second section for biasing said second and third tubes to be normally non-conductive; means for biasing said fourth tube to be normally non-conductive; an electronic trigger circuit mounted on said first section and operable to supply positive-going electric pulses to the control grid of said first tube, whereupon said first tube conducts a pulse of current for charging said first capacitance to produce a sudden voltage increase between said first and second sections; a cathode follower mounted on said second section and connected in responsive relation to the voltage between said first and second sections, the control grid of said third tube being connected to said cathode follower so that said third tube becomes conductive responsive to the aforesaid voltage increase, whereupon said second capacitance charges through said third tube to produce a sudden voltage increase between said second and third sections; means for subsequently rendering said fourth tube conductive; whereupon a sudden voltage drop is provided across said resistor; an electronic trigger circuit mounted on said second section and operable responsive to the aforesaid voltage drop for supplying a positive-going pulse to the control grid of said second tube, whereupon said second tube becomes conductive and discharges said first capacitance to provide a sudden voltage decrease between said first and second sections, thereby rendering said third tube non-conductive, said second capacitance then discharging through said resistor and said fourth tube in series to produce a sudden voltage decrease between said second and third sections; whereby an essentially rectangular-waveform voltage pulse is provided between said second and third sections.

9. Electrical pulse-forming apparatus as claimed in claim 7, further defined by a cathode follower tube having a control electrode and having a cathode connected to said second conductor through a cathode resistor, a resistor coupling the control electrode of said cathode follower tube to said first conductor, a connection between said cathode follower tube and said third tube for control of the latter, and a rectifier connected between said first conductor and the cathode of said cathode follower tube oriented to conduct current from the cathode to the conductor.

References Cited in the file of this patent

UNITED STATES PATENTS

| | | |
|---|---|---|
| 2,820,922 | Fathauer | Jan. 12, 1958 |
| 2,822,538 | Trevor | Feb. 4, 1958 |